May 31, 1960     C. H. McINTIRE     2,939,108

AUTOMOBILE SIGNALLING DEVICE

Filed Oct. 22, 1957     3 Sheets-Sheet 1

Inventor:
Christian H. McIntire
By Horton, Davis, Brewer & Brugman
Attys.

May 31, 1960 C. H. McINTIRE 2,939,108
AUTOMOBILE SIGNALLING DEVICE
Filed Oct. 22, 1957 3 Sheets-Sheet 2
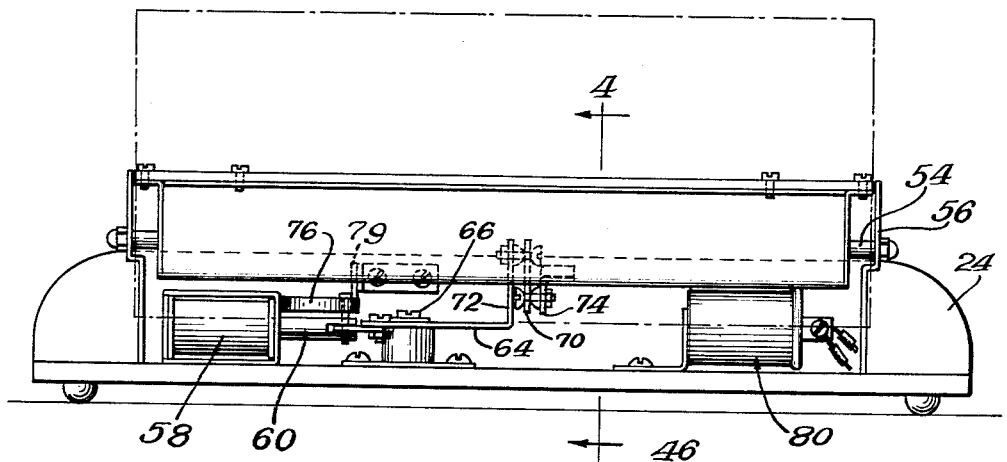
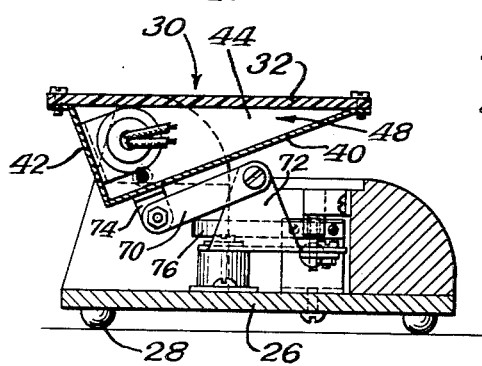
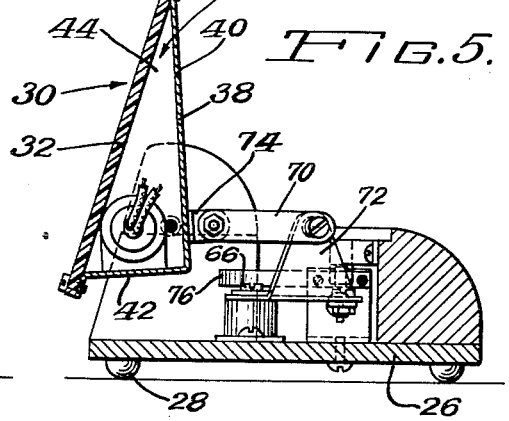
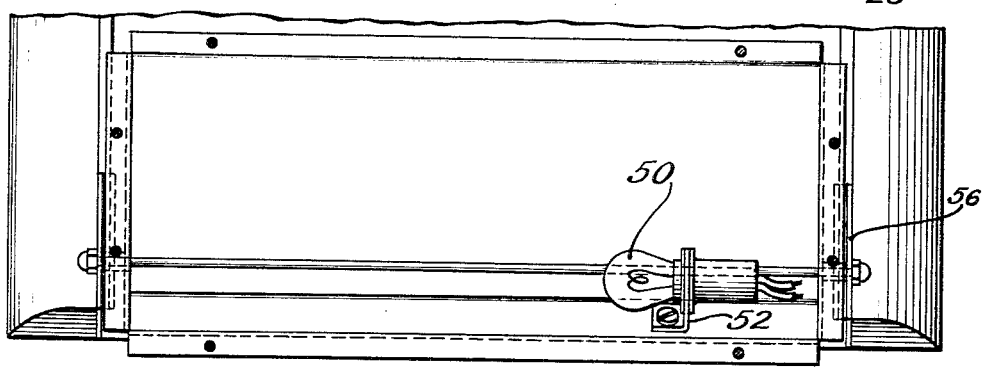
Inventor:
Christian H. McIntire
By Horton, Davis, Brewer & Brugman
Attys.

May 31, 1960 C. H. McINTIRE 2,939,108
AUTOMOBILE SIGNALLING DEVICE
Filed Oct. 22, 1957 3 Sheets-Sheet 3

Inventor:
Christian H. McIntire
By Horton, Davis, Brewer & Bregman
Attys.

United States Patent Office 2,939,108
Patented May 31, 1960

2,939,108
AUTOMOBILE SIGNALLING DEVICE
Christian H. McIntire, 827 Foster St., Evanston, Ill.
Filed Oct. 22, 1957, Ser. No. 691,560
9 Claims. (Cl. 340—127)

The present invention relates to an automobile signalling device, i.e., a device for use on automobiles for giving appropriate signals to drivers of other automobiles.

Automobile traffic conditions are constantly becoming more severe and it becomes more necessary to give appropriate signals to drivers of other automobiles so as to facilitate driving for all concerned and to provide a greater degree of safety, particularly in view of the greater speed that drivers at present indulge in. The greater speeds of automobiles in addition to increasing the danger involved, render it difficult to give the appropriate signals as desired. It is necessary for all drivers to be more alert and careful in giving signals to other drivers, and to give additional kinds of signals, so as to minimize the danger involved.

A broad object of the present invention is to provide a new signalling means for giving signals to the driver of the automobile following the automobile on which the novel device is installed.

Another and more specific object is to provide a signalling device for an automobile adapted for mounting at the rear for presenting a signal through the rear window of the automobile and arranged for movement into and out of signalling position and when in signalling position presenting a signal which can be easily seen by the driver of the automobile in the rear and when out of such signalling position it is entirely inconspicuous and for practical purposes out of sight to the driver in the automobile in the rear.

Another object is to provide a signalling device of the character just noted in which intermittent illumination of the signal is produced when the device is in signalling position.

Another object is to provide a signalling device for an automobile that is of simple construction and operated in a simple manner under the control of the driver.

Another object is to provide a signalling device of the character noted having means for illuminating the member on which the signal is produced when the signalling device is in signalling position, and further in which means is provided for shielding the light means which produces the illumination from the interior of the automobile.

A further object is to provide a signalling device of the foregoing character which includes simple mechanical construction.

Other objects and advantages of the invention will appear from the following detailed description taken in conjunction with the accompanying drawings, in which:

Fig. 3 is a rear elevational view of the device in non-signalling position;

Fig. 4 is a sectional view taken on line 4—4 of Fig. 3;

Fig. 5 is a sectional view oriented according to Fig. 4, but with the signal panel in signalling position;

Fig. 6 is a view oriented according to Fig. 2, but with one of the elements of the signal panel removed to show the interior of the latter;

Figure 1:
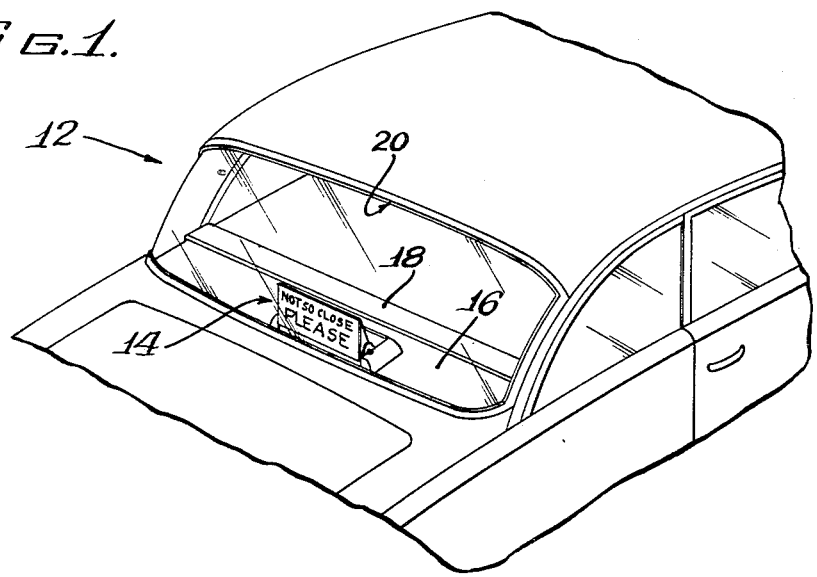
Figure 1 is a fragmentary perspective view of an automobile showing the novel signalling device of the invention installed therein.

Referring now in detail to the drawings, reference is made first to Fig. 1 showing at 12 a fragmentary perspective view of an automobile in which the novel signalling device is mounted. The signalling device is shown as a whole at 14 and is mounted on a shelf or deck 16 usually provided to the rear of and adjacent the top of the rear seat 18 of the automobile. As is generally known, most, if not all, automobiles are provided with such shelf or deck 16 and are further provided with a rear window 20 and usually the shelf or deck 16 is adjacent and slightly below the lower edge of the window. This positioning of the shelf 16 relative to the lower edge of the rear window is utilized to good effect in the present invention. The signalling device 14 is supported on the deck 16 and when it is in signalling position as indicated in Fig. 1 it is clearly visible through the window and conspicuous to the driver of the automobile to the rear of the present automobile in which the device is installed, and in such position that the driver of the automobile in the rear may easily view it with a minimum of distraction, since his line of sight in viewing the signalling device is very close to that when watching the road.

The signalling device includes a base member 22 which may be any of a variety of detail physical constructions and in the present instance may include what is generally in the shape of a housing made up of a perimeter member that may be of any suitable material such as wood or plastic. This member 24 extends on three sides of the housing and is secured to a base member 26 which preferably is in the form of a flat plate. If desired, resilient toe members 28 may be secured to the lower surface of the plate member 26, these toe members engaging the surface (shelf 16) that supports the device.

Mounted on and cooperating with the base member or housing 22 is a signal panel 30 which bears the inscription forming the signal intended to be given and which is movable on the housing or base member between an upper signalling position of Fig. 5 to a lower non-signalling position of Fig. 4.

Figure 2:
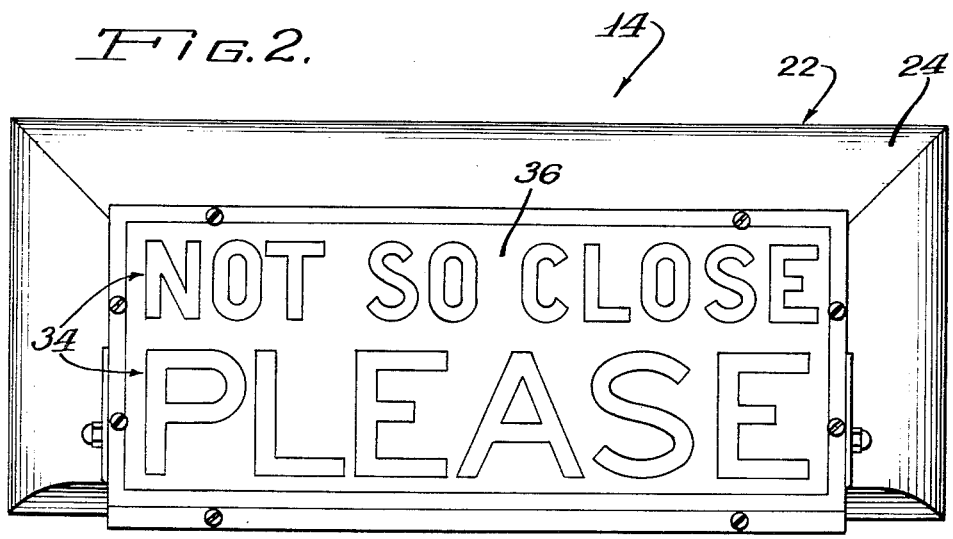
Fig. 2 is a large scale plan view of the device.

The signal panel 30 includes a main panel element 32 on which is formed an inscription 34 (Fig. 2) giving a message intended to constitute the desired signal. Specifically, the signal to be transmitted in the present instance includes the message "Not So Close Please" as a warning to the driver of the automobile in the rear to forestall the approach of that automobile to a position too close to the present automobile, i.e., the automobile in which the signalling device is installed. The inscription 34 may be produced in any of a number of different ways, but I prefer to form it by masking the panel element 32. Preferably, the panel element 32 is made of glass or glass-like material and is transparent or translucent, and preferably the latter. The masking material indicated at 36 may be in the form of a paint applied to the outer surface of the panel element 32, the paint being opaque material, the unmasked portions then forming the letters of the inscription 34 and enabling light to be transmitted therethrough. It is, of course, within the compass of the invention to provide the inscription 34 by two separate members secured together, but it is preferred that the panel element or glass 32 form the body of the panel element and the masking material be merely applied thereto, as described.

Cooperating with the panel element 32 is a shield member 38 secured to the surface thereof opposite that bearing the inscription 34, or the inner surface thereof. This shield member 38 includes an element 40 generally plate-like in shape and approaching the dimensions of the panel element 32 in size, but disposed at an angle thereto and having one side spaced from the panel element 32, and an L-shaped leg portion 42 extending to the panel element. Also, the shield member 38 includes end segments 44 whereby when the shield member is secured to the panel element 32, by suitable means such as screws 46, an interior space 48 is formed in the panel 30. Disposed in this space is a light means in the form of a suitable electric lamp 50 mounted in position by suitable means such as a bracket 52. The light or lamp 50 as shown in Fig. 6 may be in the form of a bulb, or it may be in the form of a tube extending preferably the entire length of the panel so that a greater quantity of light is distributed more uniformly over a greater area of the panel element 32 so as to more uniformly illuminate the inscription 34.

The panel 30 is mounted on the base member or housing 22 for pivotal swinging movement between its signalling position and its non-signalling position. The means for so mounting the panel may take the form of pins or studs 54 secured in the end element 48 and supported in brackets 56 mounted on or secured to the end elements of the perimeter member 24. The elements 54 for so mounting the panel may be of any desired detail construction, such as a bolt and spacer arrangement, or other construction.

Figure 7:
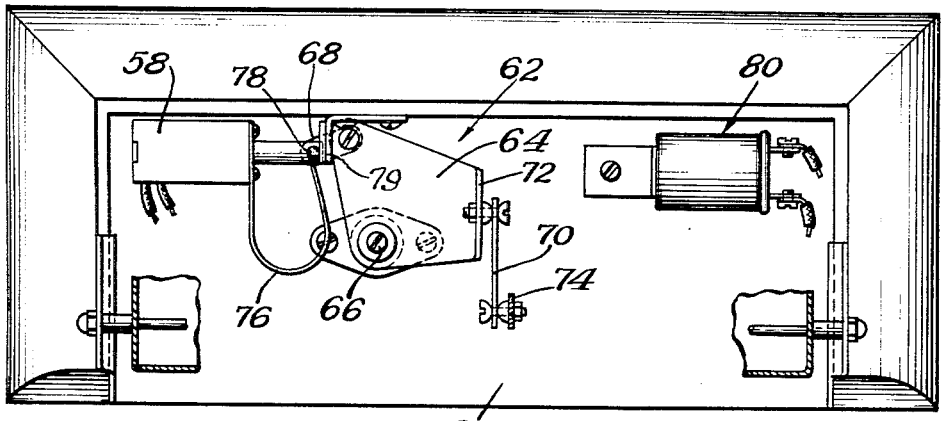
Fig. 7 is a top view oriented according to Fig. 2, but with the signal panel removed to show the interior of the main portion of the device.
Figure 8:
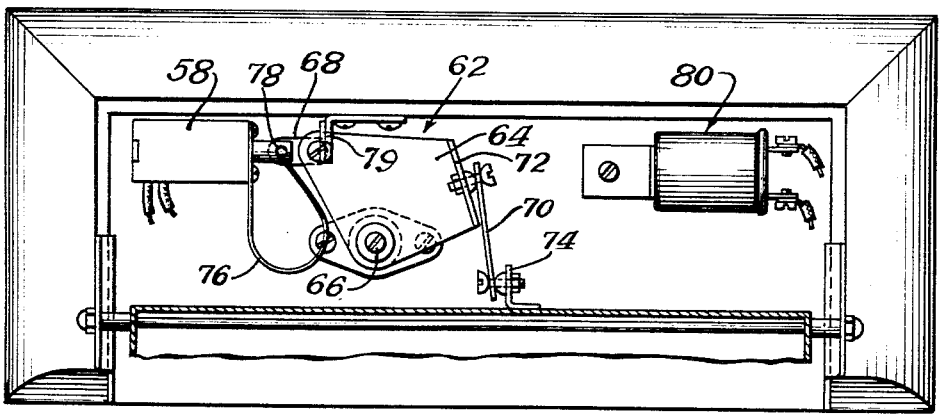
Fig. 8 is a view similar to Fig. 7, but with certain elements in different relative positions.

The panel 30 is actuated by an electrically controlled means for moving it between its signalling and non-signalling positions. This electrically controlled means preferably takes the form of an electromagnet or solenoid 58 mounted in the base member or housing 22 and is provided with an armature 60. A linkage, indicated in its entirety at 62 and best shown in Figs. 7 and 8, is interconnected between the armature 60 and the panel 30 for producing the movements of the panel mentioned. This linkage includes a bell crank lever 64 pivotally mounted on a pivot means 66 on the base plate 26, for swinging movement about a vertical axis. Interconnecting the armature 60 and one leg of the bell crank lever 64 is a link 68 pivoted at its ends to the respective ones of those members, and interconnecting the opposite leg of the bell crank lever and the panel 30 is another link 70 which is pivoted at its ends to the members mentioned. The means for so connecting the link 70 includes an upturned flange 72 on the bell crank lever 64 and an arm or bracket 74 secured to the shield member 38 on the panel.

The bell crank lever 64 is moved in counterclockwise direction (Figs. 7 and 8) by the electromagnet 58 in response to energization of the latter which retracts the armature 60 thereinto. This movement through the bell crank lever and link 70 effects swinging movement of the panel 30 from the lower or non-signalling position of Fig. 4 to the upper or signalling position of Fig. 5. So long as the electromagnet remains energized the signalling panel remains in upper signalling position. Upon de-energization of the electromagnet 58 the panel 30 is biased to lower, non-signalling position by means of a spring 76 which may be of any suitable or desired type and preferably is a leaf spring having one end secured to the electromagnet 58 or the bracket which mounts it, and the other end connected to the armature 60 through the medium of a pin 78 which forms the means for connection between the armature and the link 68. The spring 76 is biased or prestressed for moving the linkage 62 in the direction for moving the panel to lower position, namely, for moving the bell crank lever 64 in clockwise direction about its pivot 66 and the other elements in corresponding directions. Suitable stop means 79 is positioned for engagement by the pin 78 and limiting the movement of the panel to lower position, and supporting it in that position. The electromagnet is arranged for movement of its armature in the direction of the long dimension of the device, so as to provide greater throw, while the panel moves generally in the direction of the short dimension, the linkage including the bell crank lever providing the desired translation of movement.

Figure 9:
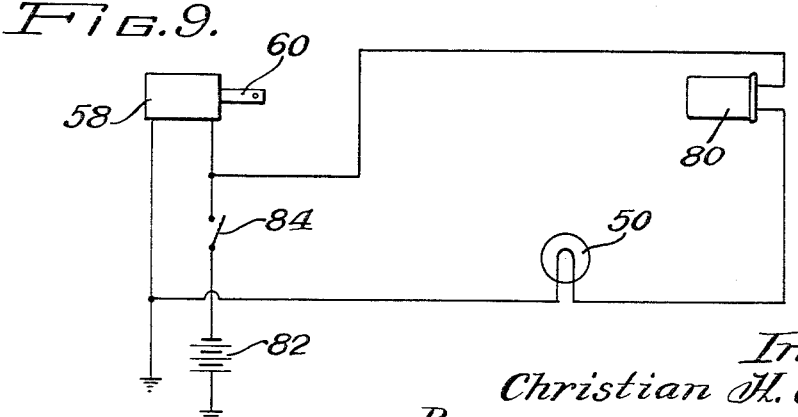
Fig. 9 is a diagram of the circuit utilized in the device.

The light means or lamp 50 is arranged for illuminating the inscription 34 when the panel is in signalling position. It is desired that the illumination be of intermittent character and for this purpose a flasher means 80 which may be of conventional character, is utilized. The flasher as well as the other electrical instrumentalities including the lamp 50 and electromagnet or solenoid 58 are included in the circuit diagram of Fig. 9. Also included in the circuit diagram is a battery 82 which is the customary battery provided in the automobile. The circuit furthermore includes a switch 84 which is manually controlled and is located at a convenient position such as on or near the steering staff of the automobile, for convenient manipulation by the driver of the automobile. If desired, simple lighting means, of non-flashing character may be used instead of the flashing kind, in which case the flasher means 80 may be omitted.

In the use of the device, assume that an automobile is approaching the rear of the present automobile at what is considered to be a dangerous position. It is difficult to transmit a manual signal to the driver of the automobile in the rear to remain further back. It is important, however, that the driver remain back at a considerable distance for safety not only from the standpoint of sudden stopping, but from other standpoints such, for example, as the driver of the present automobile turning out to pass an automobile ahead of him. Thus, it would be dangerous to have an automobile close to the rear of the present automobile constantly. The device of the present invention renders it possible to give such a message or warning with great facility. The driver of the present automobile merely closes the switch 84 (Fig. 9) and this operation energizes the electromagnet 58 which as a consequence swings the panel 30 up into signalling position, shown in Figs. 1 and 5. When it is in such position the panel with the inscription 34 is disposed above the lower edge of the rear window and the inscription is clearly exposed through the window. The panel is held or maintained in such position as long as the switch 84 is retained closed. Similarly, the light or lamp 50 produces a flashing or intermittent illumination of the inscription whereby to better attract attention of the driver in the rear. When the driver of the present automobile is satisfied that the automobile in the rear of him is back at a safe distance he opens the switch 84 and the light 50 is extinguished, and the panel 30 moves downwardly to its non-signalling position. The panel is urged in the latter direction by the spring 76, but it may be desired also to utilize gravity for this purpose. However, a condition of balance of the panel approaching equilibrium is satisfactory, so as to minimize the forces required for moving the panel in either direction.

When the signal panel 30 is in its lower or non-signalling position, the device as a whole assumes a relatively flat and compact conditions, and as such is relatively inconspicuous, being on the shelf or deck 16 preferably below, or at least partially below, the lower edge of the rear window 20. Moreover, the signal panel is arranged in horizontal and flat position so as not to attract the attention of the driver of the automobile in the rear.

Thus, the signalling means moves between a signalling and non-signalling position, and when in its signalling position is illuminated with a flashing or intermittent light means.

It will be appreciated that the details of the mechanical structure utilized may be varied widely within the limits of the invention. For example, the panel 30 may be disposed considerably lower on the base member 22 than here illustrated, when it is in its non-signalling position so as to be close to the open top side of the base member.

The light means or lamp 50 utilized for illuminating the panel element 32 and the inscription thereon is shielded from the interior of the car by the shield means 38 so as not to distract the occupants of the automobile in which the device is installed, when the panel is illuminated for giving a signal to the rear.

While I have disclosed herein a preferred embodiment of the invention, it will be understood that changes may be made therein within the scope of the appended claims.

I claim:

1. A signalling device for use in a vehicle having a source of electrical current and having a rear opening such as a window and a support adjacent to and below the lower edge of the opening comprising a relatively low and box-like housing adapted for resting on said support, a panel hingedly mounted on the housing and movable between a lower horizontal position overlying and substantially closing the housing and an upright position, said panel having an inscription thereon arranged for reading from the rear of the vehicle when the panel is in upright position, electrically controlled means for moving said panel between its said positions, light means for illuminating the inscription on said panel, said light means being enclosed in the housing when said panel is in lower position, and circuit means for connecting said electrically controlled means and light means with the source of electrical current in the vehicle and including a manually actuated switch for actuation by the driver of the vehicle.

2. A signalling device comprising a relatively low and box-like housing and a panel hingedly mounted thereon for movement between a lower horizontal position substantially closing the interior of the housing and an upright position adjacent the vertical, the panel having an inscription thereon, electrically controlled means for moving the panel between its said positions, light means for illuminating said inscription, means shielding said light means from view except the illumination of the panel thereby, and circuit means for connecting the electrically controlled means and light means with a source of electrical current and including a manually controllable switch for illuminating said light means only when the panel is in upright position.

3. The combination set out in claim 2 in which the panel includes spaced panel elements defining a closed space therebetween, the light means is in said space between the panel elements, said inscription is formed by light transmitting portions in the respective panel element, and the opposite panel element constitutes a light shield.

4. A signalling device adapted for mounting for presenting a signal message in a rearward direction, comprising a base member, a panel mounted on said base member for movement between a retracted horizontal position in which it is in overlying relation with the base member and a projected position, said panel including a casing construction having a main panel element made up of a relatively opaque layer having openings therein to form an inscription and a second layer having light transmitting properties, the casing also including a shield member forming with the main panel element an interior space, light means in said interior space of the panel for illuminating said inscription, said panel when in said projected position presenting the inscription thereon in said rearward direction, said shield member when the panel is in said projected position being operative for shielding said light means in all directions except in said rearward direction, electrically controlled means for moving the panel to its projected position, means biasing the panel to its retracted position, and circuit means connected with the light means and electrically controlled means for connecting the same to a source of electrical current.

5. A signalling device comprising a housing and a panel hingedly mounted thereon for movement between a lower horizontal position substantially covering the interior of the housing and an upright position adjacent the vertical, the panel having an inscription thereon, the device having a relatively long dimension in the direction of the pivot axis of the panel and a relatively short dimension in the direction transverse thereto, an electromagnet mounted in the housing having an armature movable along the long dimension of the housing, linkage including a bell crank lever interconnecting the panel and armature for moving the panel to upright position upon energization of the electromagnet, spring means biasing the panel to lower position, flashing light means for illuminating said inscription, and circuit means for connecting the electromagnet and light means to a source of electrical current and having a manually controllable switch therein.

6. A signalling device comprising a housing generally surrounding an interior space but open at the top, a panel hingedly mounted on the housing for movement between a lower horizontal position in which it closes the open top of the housing and an upper position close to the vertical, said panel having an inscribed message thereon formed by respective light transmitting and opaque portions, electrically operated means for raising the panel to its upright position, and said panel being biased to its lower position, and light means associated with such panel positioned for directing light through the light transmitting portions thereof when the panel is in its upright position and being confined in the housing by said panel when said panel is in its lower position, said light means being illuminated when the panel is in its upright position and being extinguished when the panel is in its lower position.

7. The device of claim 6 in which the light means is mounted on the panel for movement therewith, and the panel includes shield means operative in conjunction with the panel for enclosing said light means, said shield means shielding the light means from view in all directions except through said panel.

8. The device set out in claim 6 in which said panel includes a base element of light transmitting material and an opaque coating on the upper surface thereof forming blank portions of the light transmitting material which constitute the inscription and through which light rays from said light means penetrate.

9. A device of the character disclosed comprising in combination a base member forming generally an enclosure but having an open top and having substantial vertical dimension, panel means pivotally mounted on the base member for movement between a lower position in which it overlies and effectively covers said base member and encloses the interior space thereof, and an upright position close to the vertical, said panel when in its lower position lying horizontal adjacent the top surface of said base member, said panel means including a panel element of light transmitting material having a coating of opaque material on its upper surface defining blank spaces forming an inscription, said panel means including shield means on its under surface defining with the panel element an interior space, light means in said interior space and carried by said panel means in the pivoting movements of the latter, electrically operated means for raising the panel means to its upright position, means biasing the panel to its lower position, said electrically operated means and light means being connected in circuit so that the light means is illuminated when the panel is raised to its upright position but extinguished when the panel is in its lower position, said shield means being opaque and effectively shielding said light means from all directions except through said panel element.

References Cited in the file of this patent

UNITED STATES PATENTS

| 1,108,036 | Walsh | Aug. 18, 1914 |
| 1,223,413 | Nachod | Apr. 24, 1917 |
| 1,655,907 | Kimbell | Jan. 10, 1928 |
| 1,848,927 | Beach | Mar. 8, 1932 |
| 2,473,187 | Zelk | June 14, 1949 |